Aug. 31, 1943.    W. GEYER    2,328,447
FILM SPLICING DEVICE
Filed May 15, 1940
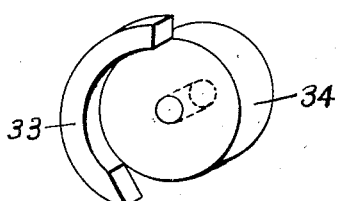
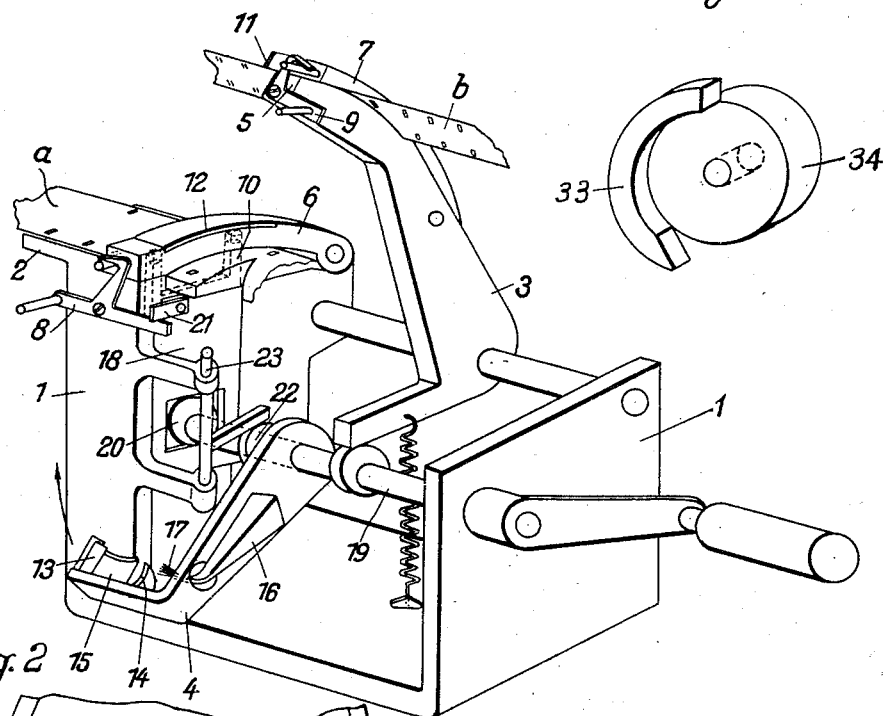
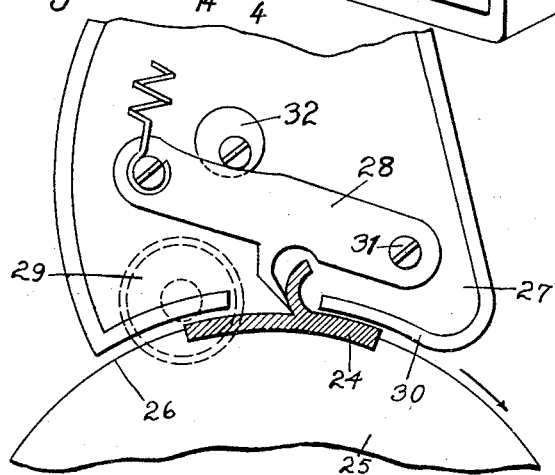

Patented Aug. 31, 1943

2,328,447

UNITED STATES PATENT OFFICE 2,328,447

FILM SPLICING DEVICE

Walter Geyer, Berlin, Germany; vested in the Alien Property Custodian

Application May 15, 1940, Serial No. 335,306
In Germany February 28, 1938

3 Claims. (Cl. 154—42)

This invention relates to a film splicing device.

The numerous expedients known for cementing the ends of films are open to the objection that they either fail to insure operation at sufficient speed or depend too much on human skill with the result that the joints produced are not always perfect and durable.

The invention aims at improving film splicing by causing the steps of trimming the film ends, removing the emulsion, applying the cement, compressing the cemented film ends or edges and releasing the cemented film to be automatically and positively performed or controlled by means of a central drive, whereby rapid and clean work of uniform accuracy involving the production of satisfactory and lasting joints is attained.

In one embodiment of the invention the arrangement is such that one of the film ends to be joined is fixed on a table and positively and successively approached by two swivel arms one of which holds a knife for removing in a single cutting operation the emulsion from the fixed end of said film and a cement dispenser for applying cement to the end, while the other arm carries a clamping means for the other film end, the first arm being preferably fitted also with a knife for trimming the fixed film end.

Further features of the invention will be pointed out in the following specification of the constructional examples shown in the accompanying drawing, in which Figure 1 is a diagrammatic view of the essential parts of a device according to the invention;

Fig. 2, a detail view of the end of a modified swivel arm equipped with knives; and Fig. 3, a detail view of a modified adjustable planing knife.

On a stand 1 supporting a table 2 for a film end a two arms 3 and 4 are rotatably arranged, the arm 3 supporting the table 5 for another film end b. The films a, b are kept in position by clamps 6, 7 movably disposed near their associated tables 2, 5 and capable of being pressed against the tables or films and locked by latches 8, 9. Each table 2, 5 is fitted with two pins 10 for adjusting the film, though it is possible also to provide only the table 2 with two pins 10, in which case, while both tables are on the same level, first the film b is adjusted and clamped to the table 5 and then the film a inserted after the arm 3 has been moved away.

The clamp 6 on the stand 1 recedes somewhat from the edge of the table 2, and the clamp 7 of the arm 3 projects slightly beyond the edge of the table 5 so as to engage the projecting edge of the table 2 at the descent of the arm 3. The edges 12, 11 of the clamps 6, 7 moving past each other during this movement either constitute cutting edges themselves or are equipped with separate cutting edges and therefore cut off the projecting end of the film b fixed on the table 5 of the arm 3.

The surface of the table 2 on the stand 1 as well as the top of the table 5 on the arm 3 are curved concentrically to the pivot shaft 19 of the arm 4, and the hold-downs 6, 7 are adapted to this curvature.

The arm 4 supports a cutting knife 13 and a planing knife 14. When the arm 4 is rotated in the direction of the arrow, the knife 13 moves along the front edge of the table 2 on the stand 1 and cuts off smoothly the film end a whilst the planing knife 14 is so constructed and arranged that it planes off the emulsion from the exposed edge of the film end a lying on the table 2, a slide way 15 disposed in front of the planing knife 14 keeping the film smooth and flat and preventing the knife from crumpling or cutting it. The slide way 15 is so adjusted that its distance from the table 2 is not greater than the thickness of the film. The arm 4 is further provided with a cement receptacle 16 and brush 17 in such manner that the brush 17 applies cement to the planed edge of the film a located in front of the clamp 6 when the arm 4 is turned in the direction of the arrow.

The arms 3, 4 are connected with a common drive by means of cams, cam discs or other suitable means so as to be positively and successively moved towards and past the table 2 on the stand 1, the arm 4 being preferably rotated always in the same direction, i. e., to the right, and the arm 3 being moved to the left only after the arm 4 has been turned to such an extent that it cannot interfere with the arm 3.

Furthermore, the pins 10, the latches 8, 9 and the hold-downs 6, 7 may also be connected with the drive, so that after the joining of the film ends a, b the pins 10 are withdrawn into the surface of the table, the clamps 8, 9 unlocked and the clamps 6, 7 opened. The pins 10 are disposed on a common slide 18 which is raised and lowered relative to the table surface by an eccentric 20 on the shaft 19 and withdraws the pins from the film at the corresponding working phase. Simultaneously, the latch 8 is opened by a driving member 21 and the latch 9 by means of an eccentric 22 and linkages 23. Suitably disposed spiral springs insure automatic turning up of the clamps 6, 7 during opening of the latches 8, 9.

In the example shown the various parts are moved by a crank, though it is possible of course to use instead a hand or foot lever, handwheel or motor.

In case of film provided with emulsion on both sides a second planing knife attached to an additional arm may serve for planing the underside of the film end $b$ fixed to the table 5.

The cement can be applied also by a positively controlled brush or other means which dips into the cement when at rest and shuts off the receptacle by a collar, or a spraying device may be used for application thus avoiding drying of cement in advance of its application to the film. The entire machine can be so arranged in a table structure that only the portion thereof used for working projects from the table and a receptacle positioned underneath receives the cuttings and shavings.

As shown in Fig. 2, the cutting knife on the arm 4 may also be disposed in the rear of the planing knife and slide way, seen in the direction of rotation, and further details may be provided which can be used also in the embodiment shown in Fig. 1.

A film 24 to be treated lies on a curved working table 25. On an arm 27 rotatable about the center of curvature 26 of the working top a planing knife 28 and a cutting knife 29 are mounted. In front of the cutting edge of the knife 28 a slide way 30 is arranged which moves over the film 24 together with the knife 28 and serves for holding down the film and thereby preventing it from being crumpled up or cut by the knife 28. To make possible adjustment of the thickness of the chip to be removed by the knife 28 and to compensate the wear of the latter the planing knife 28 can be turned about a shaft 31 and is pressed by a spring, etc., against an adjustable stop 32 having preferably the form of a rotatable eccentric disc. The distance between the slide way 30 and the working table 25 corresponds as closely as possible to the thickness of the film, and the center of curvature of the slide way 30 coincides with the center of curvature 26 of the bent table 25.

Fig. 3 shows how adjustability of the planing knife can be insured also by arranging an approximately semicircular knife 33 on the circumference or front side of a cylindrical body 34 rotatably disposed on the respective arm or on on the stand 1, the distance between the cutting edge of the knife 33 and the support for the film being then regulated by turning the body 34. The knife 33 is preferably integral with the body 34 so that the unitary structure 33, 34 may be produced by turning and milling from a piece of round material. The construction shown in Fig. 3 is simple and cheap and affords the added advantage of occupying little space, so that the dimensions of the machine can be kept down.

A device of the type shown in Fig. 1 is operated by first placing the film ends $a$, $b$ to be joined on the tables 2, 5 or over the adjusting pins 10 in such manner that the line separating two pictures is positioned exactly on the table edges facing each other. If both tables, prior to fixing the film ends, are on the same level, the film end $b$ is first placed on the movable table 5 on the arm 3, whereupon the latter is swung up and the other film end $a$ arranged on the stationary table 2 on the stand 1. The pins 10 insure exact positioning of the film ends $a$, $b$ which are then secured in position by turning down and locking the clamps 6, 7. The device is then set in motion with the result that the arm 4 moves past the stationary table 2 and the film end $a$ is successively cut to proper length by the knife 13, freed from emulsion by the plane knife 14 in one operation and then coated with cement by the brush 17. When these operations have been completed, the arm 3 will be lowered and will move the film end $b$ attached to it past the cutting edge 12 of the clamps 6 and firmly press it on to the previously cemented film end $a$, so that both ends $a$, $b$ are joined.

Shortly before the arm 4 reaches the position of rest shown in the drawing, the two clamps 6, 7 are positively unlocked and opened and the adjusting pins 10 withdrawn from the perforations of the film to facilitate removal of the joined film.

For rapid cementing work the table 2 may be electrically heated.

What is claimed is:

1. In a film splicing device the combination of a table, of means for attaching one film end to supporting faces of the table, the said faces being cylindrically arched, a swivel arm adapted to be moved past the table, a planing blade secured to the said swivel arm adapted to plane off the emulsion of the film end attached to the table when said arm is moved past said table, a slide way disposed on the said arm and in front of the film end on the table when said arm is moved past said table, a space being provided between the planing blade and the slide way adapted to act as a passage for the shavings, the curves of the arched supporting faces of the table and of the swinging movement of the said arm having the same axis, and means for driving the swivel arm.

2. In a film splicing device the combination of a table, of means for attaching one film end to supporting faces of the table, the said faces being cylindrically arched, a swivel arm adapted to be moved past the table, a planing blade secured to the said swivel arm adapted to plane off the emulsion of the film end attached to the table when said arm is moved past said table, a slide way disposed on the said arm and in front of the said planing blade adapted to hold down the film end on the table when said arm is moved past said table, the planing blade being spaced from the slide way to provide a passage for shavings, movable means adapted to support the second film end in opposed position, means for attaching said second film end to supporting cylindrically arched faces on said movable means, the arched supporting faces of the table and of the movable means and the arc of rotation of the swivel arm, being on a common radius, and means for driving the swivel arm and the movable supporting means in the requisite order.

3. In a film splicing device a combination as set forth in claim 2 wherein the movable supporting means comprises a second swivel arm adapted to be moved past the table.

WALTER GEYER.